United States Patent
Kubo

(10) Patent No.: US 7,075,578 B1
(45) Date of Patent: Jul. 11, 2006

(54) DIGITAL CAMERA WITH FLASH EMISSION CONTROL

(75) Inventor: Hiroaki Kubo, Mukou (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/556,308

(22) Filed: Apr. 24, 2000

(30) Foreign Application Priority Data

May 7, 1999 (JP) ................................. 11-127260

(51) Int. Cl.
*H04N 5/222* (2006.01)
*H04N 5/235* (2006.01)

(52) U.S. Cl. ..................................... 348/371; 348/362

(58) Field of Classification Search .................. 348/59, 348/68, 131–132, 136, 362–366, 370–371; 352/41, 47, 57, 61, 68, 138, 176, 203; 353/63, 353/82; 359/443, 455, 463; 396/171, 233, 396/268, 273

See application file for complete search history.

(56) References Cited

U.S. PATENT DOCUMENTS

| 4,476,383 | A | * | 10/1984 | Fukuhara et al. | ........ | 250/214 P |
| 5,400,112 | A | * | 3/1995 | Takagi | ........................ | 396/157 |
| 5,517,243 | A | * | 5/1996 | Kudo et al. | .................. | 348/296 |
| 5,621,494 | A | * | 4/1997 | Kazumi et al. | ................ | 396/56 |
| 5,678,079 | A | * | 10/1997 | Ogawa | ........................ | 396/234 |
| 6,035,135 | A | * | 3/2000 | Okamura | ...................... | 396/61 |
| 6,445,884 | B1 | * | 9/2002 | Yahav | ........................ | 396/106 |
| 6,654,062 | B1 | * | 11/2003 | Numata et al. | .............. | 348/362 |

FOREIGN PATENT DOCUMENTS

JP          01145639 A     6/1989

* cited by examiner

*Primary Examiner*—David Ometz
*Assistant Examiner*—Kelly Jerabek
(74) *Attorney, Agent, or Firm*—Buchanan Ingersoll PC

(57) ABSTRACT

A plurality of photosensors are provided as light measuring elements at respectively different positions within a space between an optical unit and an image sensor so as to be outside the optical path of the direct light from a photographic subject entering through an optical unit. The plurality of photosensors detect the brightness of the image sensing surface of the image sensor during photoelectric conversion by the image sensor. For this reason a light adjusting controller is capable of performing light adjusting control simultaneously with a main photography operation by controlling the flash emission based on the amount of light detected by the plurality of photosensors during image sensing.

11 Claims, 10 Drawing Sheets

(a)

(b)

(c)

(d)

DIGITAL CAMERA WITH FLASH EMISSION CONTROL

CROSS-REFERENCE TO RELATED APPLICATIONS

This disclosure is based on Patent Application No. 11-127260 filed in Japan, the content of which is hereby incorporated by reference.

BACKGROUND OF THE INVENTION

1. Field of the Invention

The present invention relates to a digital camera, and relates particularly to the art of automatic light adjusting control for flash-assisted photography.

2. Description of the Related Art

In digital cameras that generate image signals of a photographic subject by receiving and photoelectrically converting the light from a photographic subject via an image sensor, adjustment of the exposure level is accomplished using image signals obtained by the image sensor.

When flash illumination is employed when taking a photograph using a digital camera, flash light feedback control cannot be performed using the image signal photographed by the flash light because the image signal is obtained by outputting a load after the photograph is taken.

For this reason, in conventional digital cameras, a light adjusting control sensor is provided on the digital camera body for directly sensing external light, and an external light adjusting control method is used to control the flash emission based on the amount of light detected by the light adjusting control sensor. Alternatively, a leading method is pre-flash type light adjusting control which performs a pre-flash illumination immediately before photography and controls the flash emission during photography based on the image signal obtained during the pre-flash illumination.

In light adjusting control accomplished by means of the previously mentioned external light adjusting control sensor, the external light directly enters the light adjusting control sensor without mediation of a photographic lens, whereas light from a photographic subject enters the image sensor through a photographic lens such as a zoom lens or the like. For this reason the field angles are mutually different, and the light adjusting control range and the photographic range do not match so as to disadvantageously reduce light adjusting control accuracy.

In pre-flash type light adjusting control, the field angles match because the image sensor functions as the light adjusting control sensor. However, since two flash emissions are required for the pre-flash illumination and the main photography flash illumination, there is a disadvantageous time lag between light adjusting control time and the photography time.

SUMMARY OF THE INVENTION

An object of the present invention is to provide a digital camera capable of performing light adjusting control simultaneously with the main photography, and which improves light adjusting control accuracy by matching the field angles of the image sensor and the light adjusting control sensor.

These objects are attained by a digital camera comprising: an optical system through which light from a photographic subject passes; an image sensor which is disposed on an optical axis of said optical system and which receives light passing through said optical system and produces a signal representing an image of the photographic subject; a light emission system for illuminating the photographic subject; a plurality of light measuring elements which are disposed away from said optical axis and which sense light from said emission system that is reflected by the photographic subject and passes through said optical system; and a controller which controls the operation of said light emission system in accordance with the light sensed by at least one of said light measuring elements.

These objects are further attained by a digital camera comprising: an optical system through which light from a photographic subject passes; an image sensor which is disposed on an optical axis of said optical system and which receives light passing through said optical system and produces a signal representing an image of the photographic subject; a light emission system for illuminating the photographic subject; a light measuring element which is located in a space between said optical system and said image sensor, and which senses flare light within said space; and a controller which controls the operation of said light emission system in accordance with the light sensed by said light measuring element.

BRIEF DESCRIPTION OF THE DRAWINGS

In the following description, like parts are designated by like reference numbers throughout the several drawings.

DETAILED DESCRIPTION OF THE PREFERRED EMBODIMENTS

The embodiments of the present invention are described hereinafter with reference to the accompanying drawings.

1. First Embodiment

A first embodiment of the present invention is described below.

Figure 1:
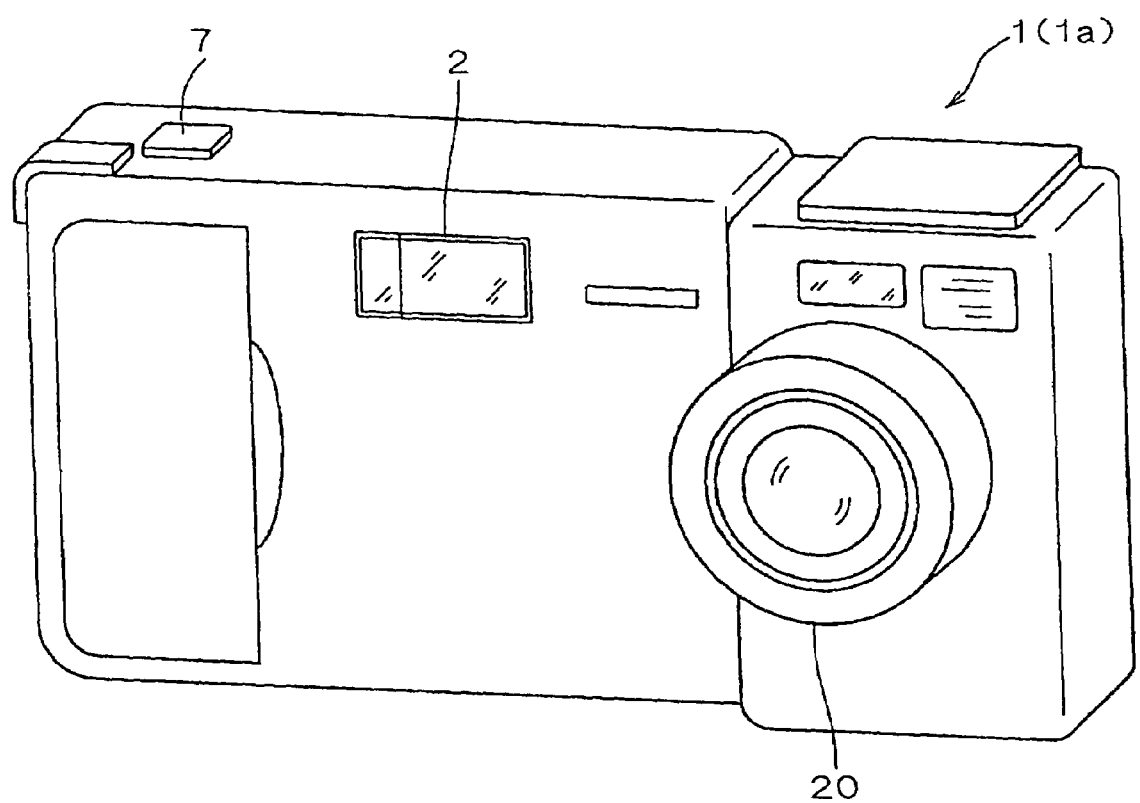
FIG. 1 is a perspective view of the exterior of a digital camera of the present invention.

FIG. 1 is a perspective view of the exterior of a digital camera 1. The digital camera 1 is provided with an optical unit 20 and flash unit 2 on the interior surface of the camera body. The optical unit 20 directs the light from the photographic subject to a photoelectric conversion element. The flash unit 2 emits flash light toward the photographic subject. A release button 7 is provided on the top side of the camera body.

Figure 2:
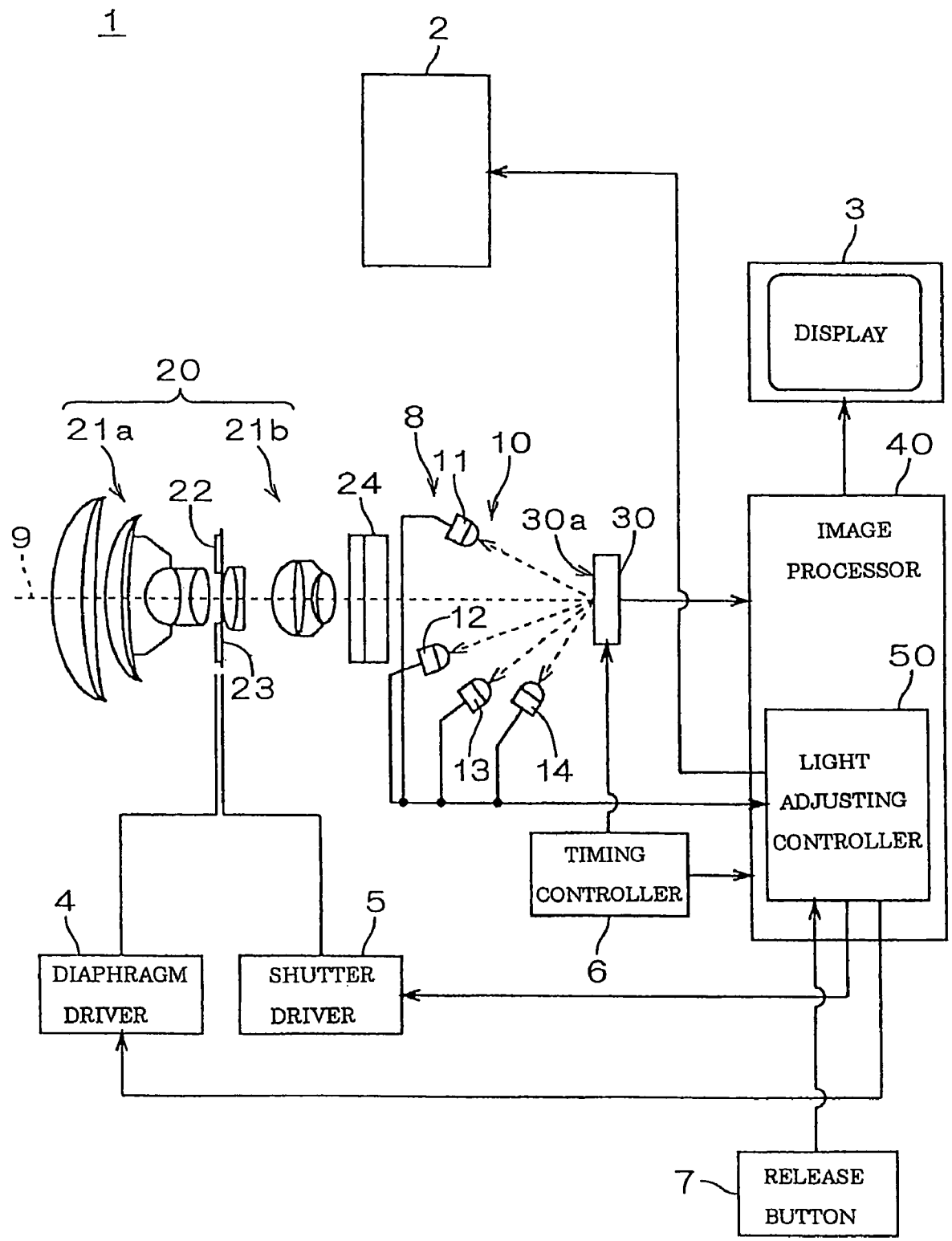
FIG. 2 shows the construction of the digital camera of a first embodiment of the present invention.

FIG. 2 shows the internal construction of digital camera 1 of the first embodiment of the present invention. Digital camera 1 comprises an optical unit 20, optical low-pass filter 24, light measuring element 10, image sensor 30, image processor 40, flash unit 2, display 3, diaphragm driver 4, shutter driver 5, timing controller 6, and release button 7. The optical unit 20, optical low-pass filter 24, light measuring element 10, and image sensor 30 are accommodated in the open space within the digital camera 1.

The optical unit 20 is provided with taking lenses 21a and 21b, diaphragm 22, and shutter 23, and is constructed so as to suitably direct light from a photographic subject to the image sensor 30. The amount of light from the photographic subject passing through the taking lens 21a is regulated by the diaphragm 22 and shutter 23, then the light passes through the taking lens 21b and the low-pass filter 24 which eliminates the high frequency component, and enters the image sensor 30.

The light measuring element 10 is arranged in the space 8 between the optical unit 20 and the image sensor 30 so as to be outside the optical path of the direct light 9 entering from the photographic subject through the optical unit 20. The light measuring element 10 is provided with a plurality of photosensors 11, 12, 13, 14 at various different positions. Each photosensor 11~14 is arranged so that the image sensing surface 30a of the image sensor 30 is within the photoreception range (i.e., the range of the incidence angle allowing suitable light detection). Accordingly, the photosensors 11~14 detect the amount of reflected light generated when the direct light 9 from the photographic subject is reflected by the surface of the image sensor 30. Each photosensor 11~14 is a photodiode or the light having high-speed responsiveness.

The image sensor 30 comprises a charge-coupled device (CCD) area sensor element or the like having a plurality of pixels within a plane (image sensing surface 30a) perpendicular to the optical axis of the entering light. The image sensor 30 generates image signals of a photographic subject by photoelectric conversion of the light from the photographic subject entering through the optical unit 20. That is, the image sensor 30 functions as a photoelectric converter, and produces image signals of a photographic subject by reading the electrical load accumulated for each pixel after a photograph is taken.

Red (R), green (G), and blue (B) primary color transmission filters, not shown in the drawing, are adhered in a checkerboard pattern in pixel units on the image sensor surface 30a side of the image sensor 30, such that each pixel has a sensitivity to each color component of the photographic subject entering the through the optical unit 20. In this type of image sensor 30, the exposure amount is optimized by controlling the load accumulation time.

The image processor 40 performs predetermined image processing of the image signals obtained by photoelectric conversion by the image sensor 30. The image processor 40 is provided with a light adjusting controller 50 for controlling the flash emission during photography.

The flash unit 2 emits flash light and terminates the flash emission toward a photographic subject based on a flash start command and a flash stop command from the light adjusting controller 50. The flash unit 2 need not be assembled as part of the digital camera 1 itself, and may be removable.

The display 3 is a display element for displaying a photographic image based on image signals subjected to predetermined processing in the image processor 40, and comprises a liquid crystal display (LCD) or the like.

The diaphragm driver 4 is a diaphragm driving element for driving the diaphragm 22 based on the diaphragm value designated from the light adjusting controller 50. The shutter driver 5 is a shutter driving element for opening and closing the shutter 23 based on control signals from the light adjusting controller 50.

The timing controller 6 comprises a microcomputer, and controls the load accumulation time and the like of the image sensor 30. The timing controller 6 controls all sequences of the digital camera 1 such as the readout timing of the image signals generated by the image sensor 30, operation timing of the light adjusting controller and the like.

The release button 7 is operated by the photographer when taking a photograph. When release button 7 is depressed, the light adjusting controller 50 transmits control signals to the flash unit 2, diaphragm driver 4, shutter driver 5, and timing controller 6 so as to control functions to provide a suitable exposure for the image sensor 30.

The digital camera 1 of the present embodiment has the previously described construction, and the light adjusting controller 50 executes flash light adjusting controls based on the amount of reflected light received by a plurality of photosensors 11~14 when a flash is reflected by the image sensing surface of the image sensor 30. That is, the controller 50 controls the flash emission when the flash unit is employed, and the image of a photographic subject is simultaneously sensed in the main photography operation.

FIG. 2 shows an example of four photosensors 11~14 provided as a light measuring element 10. However, the present invention is not limited to providing four photoreceptors inasmuch as an optional plurality of photoreceptors may be used.

Figure 3:
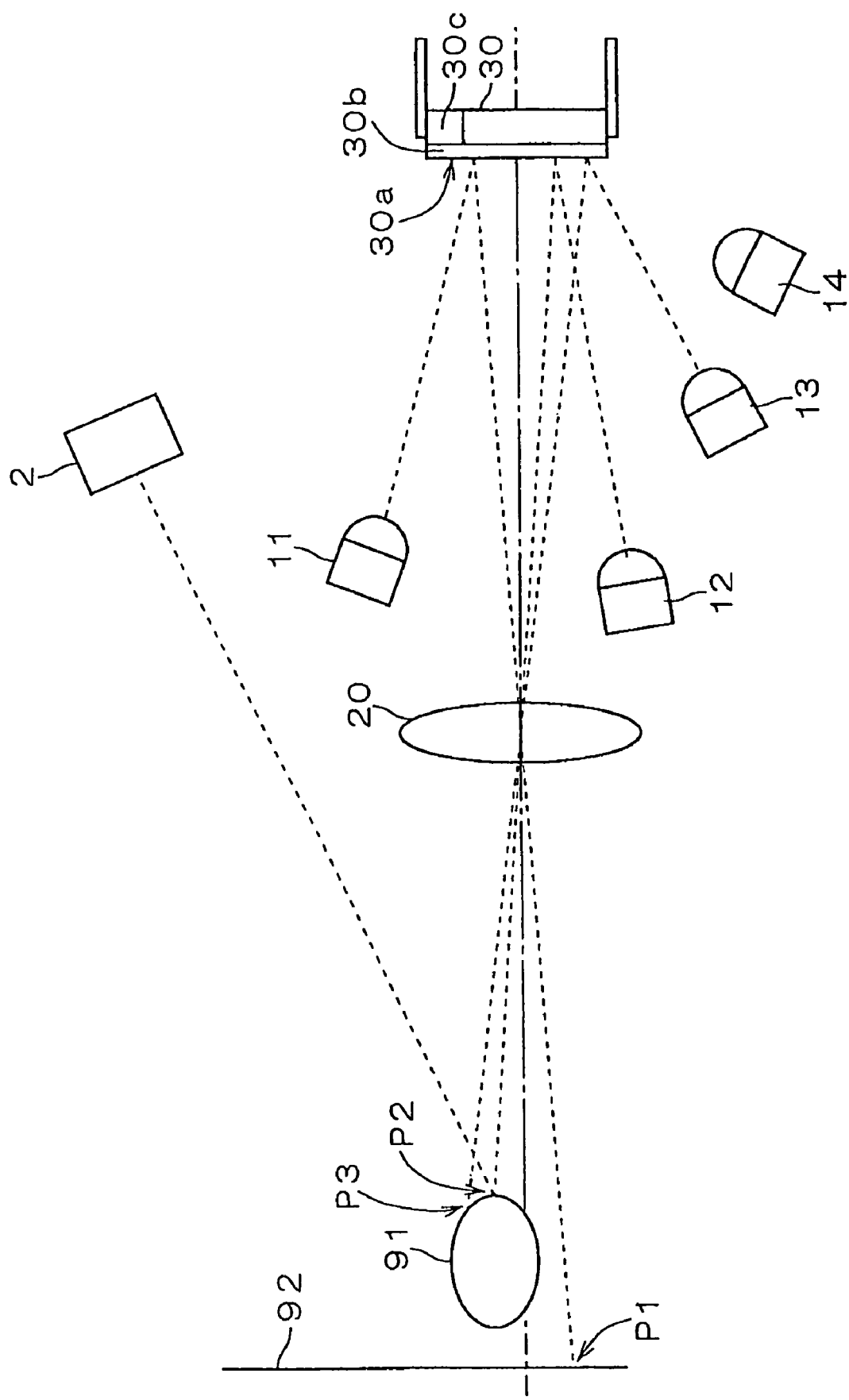
FIG. 3 shows an example of the optical paths of light entering each photosensor during flash-assisted photography.

As shown in FIG. 3, a metal unit 30b and a protective glass 30c are provided on the image sensing surface 30a of the image sensor 30 in the digital camera 1. For this reason, the image sensing surface 30a is not a uniformly reflective surface, and there is a possibility that the direct light 9 from the photographic subject is subject to regular reflection in the directions of the layout of the photosensors.

If the entirety of the surface of the photographic subject is a uniformly reflective plane, light uniformly enters relative to the protective glass, such that light adjusting control can be accomplished using a single photoreceptor disposed at a predetermined position.

When there is a glossy area causing regular reflection in the photographic subject during flash photography, the flash emission is subject to regular reflection by the glossy area, and this reflected light is also subject to regular reflection by the image sensing surface 30a with the possibility of entering the photosensor via the positional relationships among the flash unit 2, glossy area of the subject, and the photosensor. Since the regular reflection light actually enters the photosensor without necessarily being subject to photoelectric conversion by the image sensor 30, there is a mismatch between the amount of exposure light of the image sensor 30 and the amount of light detected by the photosensors. In this instance, there is a possibility that a single photosensor provided as the light measuring element 10 may not provide suitable light adjusting control.

Accordingly, four individual photosensors 11~14 are provided at different positions in the first embodiment, and the photosensors 11~14 detect the amount of regular reflection from the image sensor 30 independently. In this way, the problem of poor light adjusting control due to regular reflection is eliminated.

FIG. 3 shows an example of the optical path of light entering each of the photosensors 11~14 during flash photography. In the example of FIG. 3, a regular reflection subject 91 is provided as a photographic subject, and a reflector 92 is disposed behind the regular reflection subject 91. Flash light emitted from the flash unit 2 is reflected by the regular reflection subject 91 and forms an image on the image sensor 30 via the optical unit 20. Each photosensor 11~14 detects the brightness of the image sensing surface 30a at different angles relative to the image sensing surface 30a of the image sensor 30.

Photosensor 11 shown in FIG. 3 receives the light from position P1 on the reflector 92. Photosensor 12 receives reflected light from position P2 on the regular reflection subject 91. Photosensor 13 receives the light from position P3 on the regular reflection subject 91. Photosensor 14 does not receive any reflected light from the photographic subject.

Figure 4:
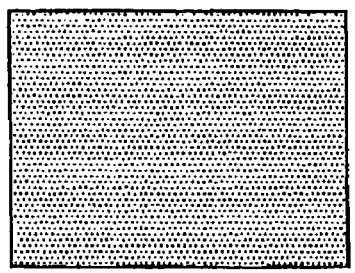
FIG. 4 shows the photoreceptor surface of each sensor in FIG. 3.
Figure 4:
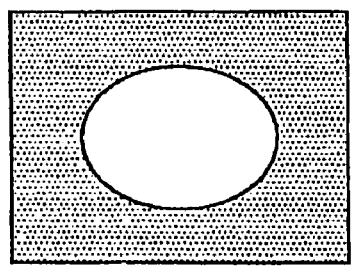
Figure 4:
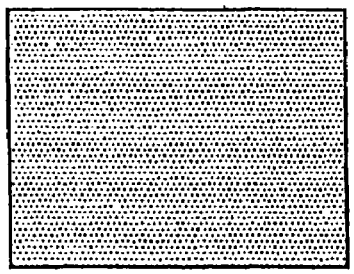
Figure 4:
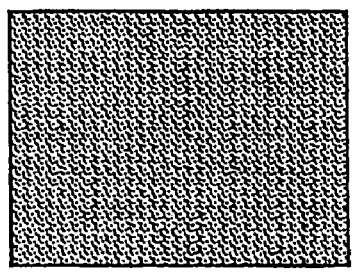

FIG. 4 illustrates the photoreceptor surface of each photosensor 11~14 of FIG. 3; (a) shows the photoreceptor surface of photosensor 11, (b) shows the photoreceptor surface of photosensor 12, (c) shows the photoreceptor surface of the photosensor 13, and (d) shows the photoreceptor surface of photosensor 14.

As shown in FIG. 4, photosensor 11 and photosensor 13 suitably detect the light of the photographic subject because the direct flash light does not enter these sensors. The photoreceptor surface of the photosensor 14 is darker than the other photosensors due to the small amount of entering light compared to the other photosensors.

On the other hand, since the regular reflection light of the flash emission directly enters the photosensor 12, photoreception exhibits a local high degree of brightness as illustrated in FIG. 4(b). As a result, the amount of light detected by the photosensor 12 is markedly greater than the amount of light detected by the other photosensors. That is, an abnormal level of light is detected by the photosensor 12.

In the first embodiment, the light adjusting controller 50 specifies the photosensors producing normal values (hereinafter referred to as a "normal value photosensor") by excluding the photosensors which produce a value of a relatively large abnormal level based on the photoreception data of a plurality of sensors 11~14. The light adjusting controller 50 controls the flash emission using the photoreception data of the normal value photosensors.

Figure 5:
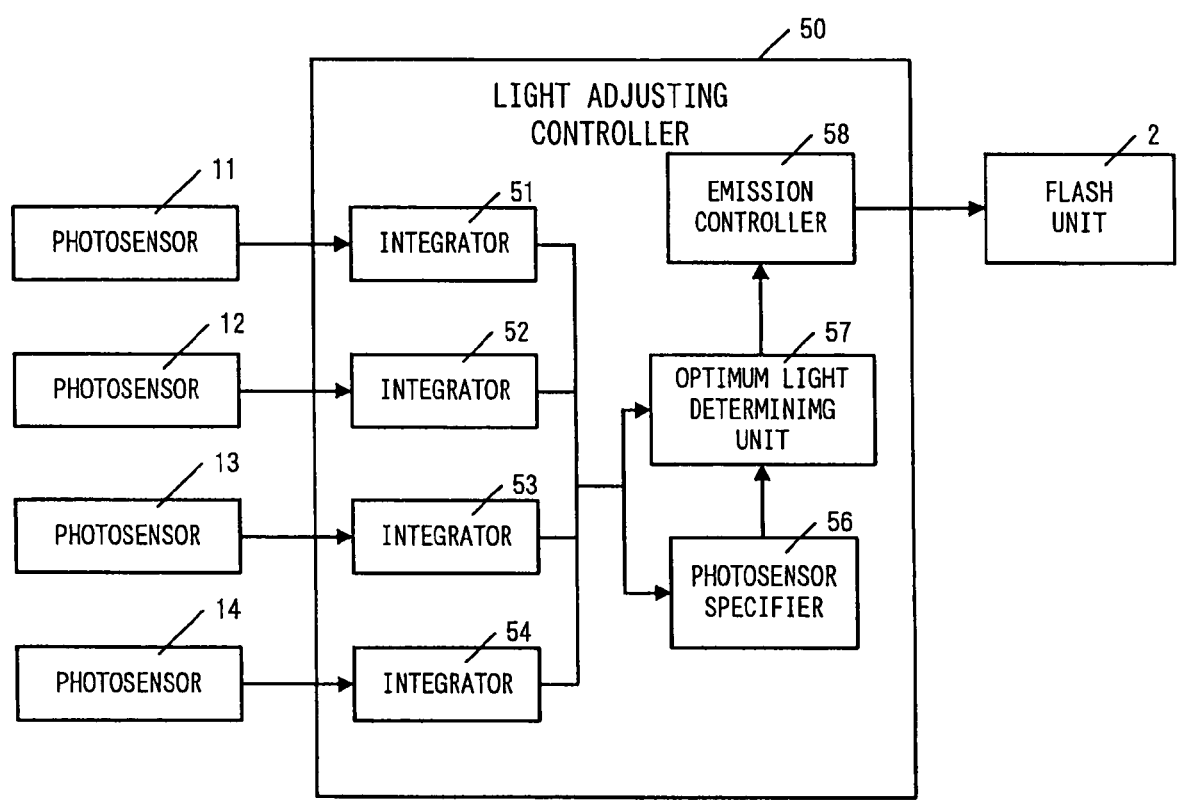
FIG. 5 is a block diagram schematically showing part of the functional means for realizing light adjusting control of the first embodiment.

FIG. 5 is a block diagram schematically showing part of the functional elements realized in the light adjusting controller 50. Functional elements of the light adjusting controller 50 include integrators 51, 52, 53, 54, photosensor specifier 56, optimum light determining unit 57 and emission controller 58. The integrators 51~54 are provided for each sensor, respectively. The photosensor specifier 56 specifies the normal value photosensors. The optimum light determining unit 57 determines whether or not the flash illumination is optimum based on the light detected by the normal value photosensors. The emission controller 58 controls the flash emission start timing and stop timing based on the determination result of the optimum light determining unit 57.

The integrators 51~54 perform an integration operation on the photoreception data from each photosensor 11~14 with predetermined timing. The integrators 51~54 transmit the integration value of each photosensor obtained by the aforesaid calculation to the sensor specifier 56 and the optimum light determining unit 57.

The photosensor specifier 56 determines the average value of the integration values of the photoreception data, and sets the standard level for the specifying normal value sensor from this average value. The standard value, for example, may be the average value used directly, or may be a value obtained by integrating an optional coefficient in the standard value. The photosensor specifier 56 extracts sensors exhibiting less than the standard level set by the integration value of the photoreception data, and specifies the extracted photosensors as normal value photosensors. The photosensor specifier 56 transmits information representing the normal value photosensors to the optimum light determining unit 57.

The optimum light determining unit 57 integrates the photoreception data of each photosensor in fixed periods relative to each integrator for the normal value photosensors specified by the photosensor specifier 56. The optimum light determining unit 57 determines the average value of the integration values of the normal value photosensors obtained via integration in fixed periods. The optimum light determining unit 57 successively outputs a value (hereinafter referred to as a "light representative value") corresponding to the amount of light received by the normal value sensors until that time, by cumulative addition of the calculated average value of each period.

The optimum light determining unit 57 determines whether or not the light representative value attains a predetermined optimum value representing the optimum light level, and transmits the flash emission stop timing to the emission controller 58 based on the result.

The emission controller 58 transmits a predetermined control signal to stop the flash emission to the flash unit 2 based on the emission stop timing.

In the first embodiment, the regular reflected light does not enter all the photosensors because the image sensing surface 30a of the image sensor 30 enters the photoreception range of each photosensor at mutually different positions. For this reason, light adjusting can be suitably controlled by suitably controlling the flash emission via the light adjusting controller 50. In the first embodiment, flash light adjusting control is accomplished via a through-the-lens (TTL) method, as is clear from the layout position of the photosensors 11~14. Accordingly, light adjusting can be controlled with high accuracy because the field angles of the image sensor 30 and the light measuring element 10 match.

In the first embodiment, light adjusting control can be accomplished simultaneously with the main photography because a separate light measuring element 10 for light adjusting control is provided. Accordingly, the disadvantage of time lag between light adjusting control by the conventional pre-flash method and taking the actual photograph does not occur.

Figure 6:
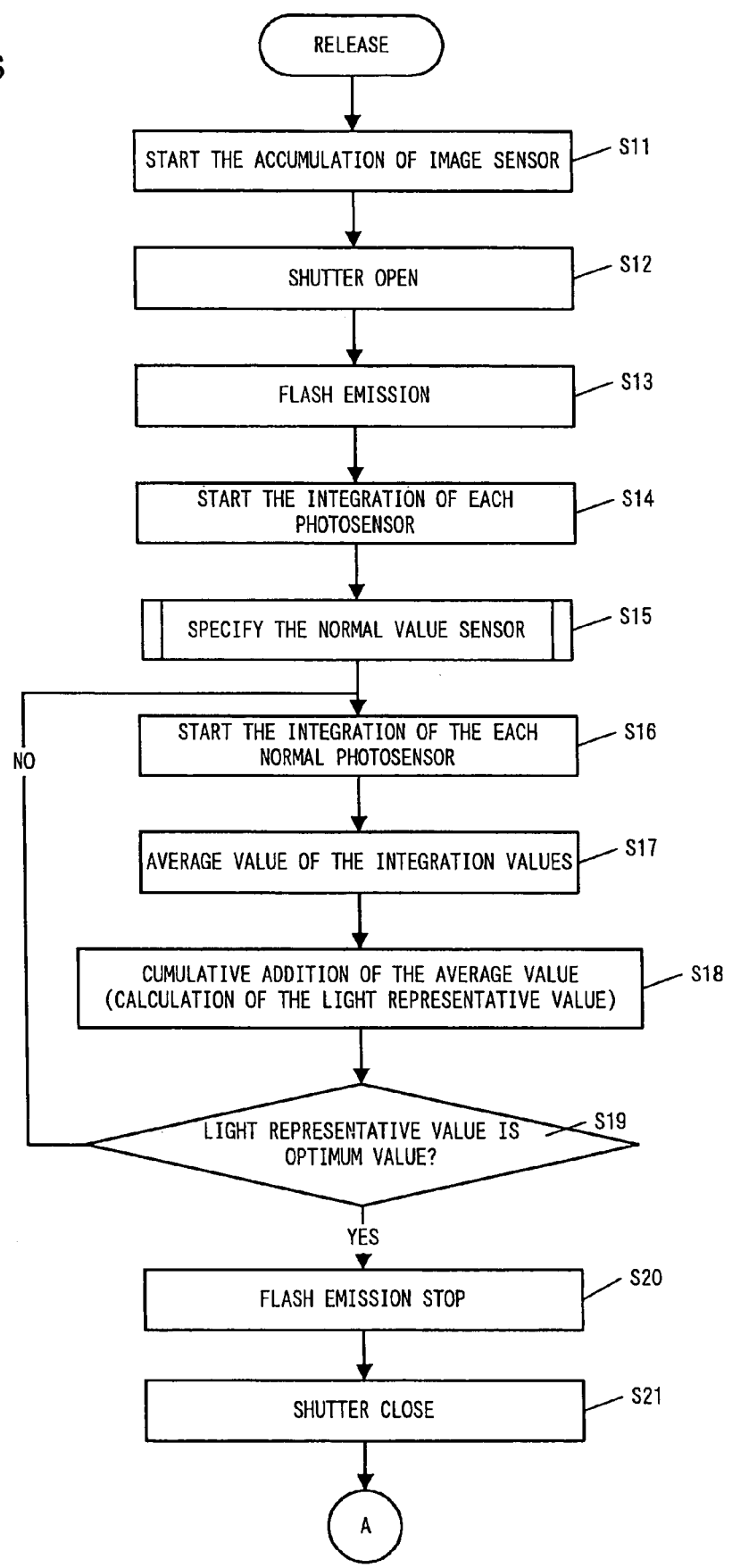
FIG. 6 is a flow chart of the operating sequence of the digital camera of the first embodiment.
Figure 7:
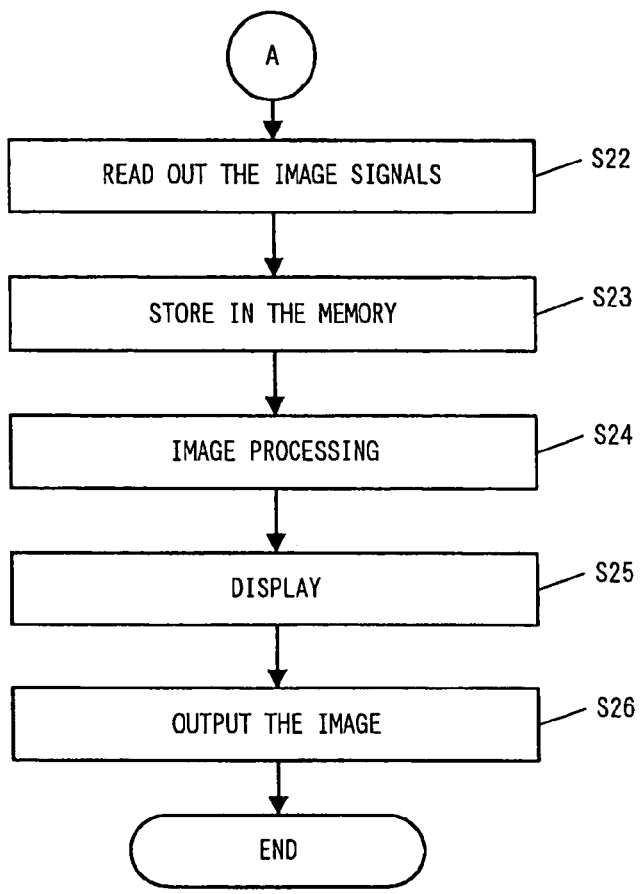
FIG. 7 is a flow chart of the operating sequence of the digital camera of the first embodiment.
Figure 8:
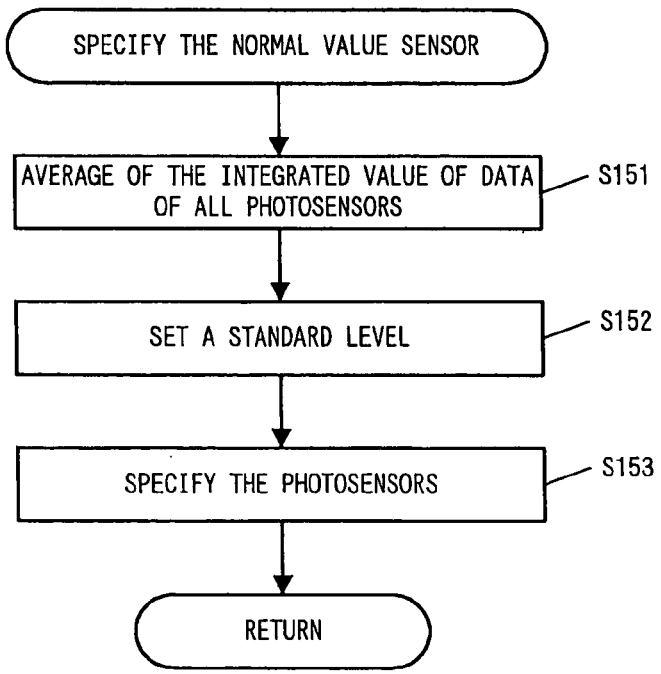
FIG. 8 is a flow chart of the operating sequence of the digital camera of the first embodiment.

The operating sequence of the light adjusting control in the digital camera 1 of the first embodiment is described below. FIGS. 6~8 are flow charts showing the operating sequence of the digital camera 1 of this embodiment. Each of the following steps are sequentially executed when a photographer takes a photograph, i.e., depresses the release button 7.

First, the light adjusting controller 50 starts the load accumulation of image sensor 30 by a command transmitted to the timing controller 6 (step S11). Then, light adjusting controller 50 sets the diaphragm 22 to a predetermined opening diameter via a command transmitted to the diaphragm driver 4. The light adjusting controller 50 opens the shutter 23 to allow light from the photographic subject to reach the image sensor 30 by transmitting a command to the shutter driver 5 (step S12). Next, the light adjusting controller 50 starts the flash emission via an emission start command transmitted to the flash unit 2 (step S13).

Then, light adjusting controller 50 starts the integration operation of photoreception data obtained from each photosensor 11~14 (step S14). The integration operation is performed for each photosensor.

In step S15, light adjusting controller 50 specifies the normal value sensors. Details of the operating sequence of step S15 are shown in the flow chart of FIG. 8. Light adjusting controller 50 first determines the average value of the integrated values of photoreception data of all photosensors to specify the normal value sensors (step S151). Light adjusting controller 50 sets a standard level as a specific standard for normal photosensors based on the aforesaid average value (step S152). Then, light adjusting controller 50 specifies that the photosensors having integration values of the photoreception data less than the standard level set in step S152 as normal value sensors (step S153).

Returning now to the flow chart of FIG. 6, light adjusting controller 50 starts the integration of photoreception data from the normal value sensors specified in step S15 (step S16). The integration operation is performed for each normal photosensor.

Then, light adjusting controller 50 determines the average value of the integration values obtained for each normal value photosensor (step S17). Next, light adjusting controller 50 determines the light representative value by cumulative addition of the average values of the light integration values of each normal value photosensor determined up to now (step S18).

In step S19, a determination is made as to whether or not the light representative value determined in step S18 has attained an optimum value. If the determination is [NO], the routine returns to step S16, whereas if the determination is [YES], the routine advances to step S20.

When the determination is [NO], the processes of steps S16~S18 are repeated. That is, photoreception data integration, averaging of the photoreception data integration values, and cumulative addition of the average values are sequentially performed, to successively update the light representative values. As a result, the light representative value becomes a larger value in conjunction with the increase in the number of repetitions. When the light representative value attains the optimum value, the determination is [YES] in step S19.

That is, the loop process of steps S16~S19 is a process for determining whether or not the light received by the normal value photosensors during each fixed period has attained a suitable light adjusting level.

When the determination of step S19 is [YES], light adjusting controller 50 determines that the exposure is optimized for the image sensor 30, and issues a flash emission stop command to the flash unit 2 (step S20). The light adjusting controller 50 continues flash emission in the direction of the photographic subject from the start of flash emission in step S13 until the emission stop command is issued in step S20.

Then, light adjusting controller 50 issues a command to the shutter driver 5 to close the shutter 23 so as to block the light from the photographic subject (step S21). From step S12 to step S21 the image sensor 30 has been exposed to light via the open state of the shutter 23.

Continuing now with the flow chart of FIG. 7, light adjusting controller 50 issues a command to the timing controller 6 to end the load accumulation and read out the image signals (step S22). In this way the image signals of the photographic subject obtained by the image sensor 30 are transmitted to the image processor 40.

When image signals are input to the image processor 40 from the image sensor 30, these signals are temporarily stored in a memory, not shown in the drawing (step S23). Then, image processor 40 subjects the image signals to predetermined image processing such as pixel interpolation, white balance adjustment and the like (step S24). Thereafter, image processor 40 displays a preview of the processed image signals on display 3 (step S25). A photographer is able to determine whether or not the intended image was photographed via the preview display. The image signals are output to a memory card or the like when the photographer specifies a specific output (step S26), and this ends one operation sequence of the digital camera 1 of the first embodiment.

In this operating sequence, the integration operation started fresh with each repetition of steps S16~S19. However, the present invention is not limited to this procedure, inasmuch as the integration value of the photoreception data increases in conjunction with the time elapsed when the integration operation started in step S14 continues, and this integration value may be used. In this instance, the processes of steps S16 and S18 are unnecessary, and the average value of the light integration values obtained at this point in time may be determined (step S17), and this average value may be used as the light representative value.

As described above, the digital camera 1 of the first embodiment provides an image sensor 30 which receives the direct light 9 from a photographic subject entering through an optical unit 20, and subjects this direct light 9 to photoelectric conversion to generate image signals of the photographic subject, and further provides a plurality of light measuring elements 10 in a space 8 medial to the optical unit 20 and the image sensor 30. Flash light adjusting control is accomplished based on the amount of light detected by the light measuring elements 10. As a result, the field angle of the image sensor and the photosensors match, such that light adjusting control accuracy is improved and light adjusting control can be accomplished simultaneously with the main photographic operation.

The photosensors 11~14 provided as the light measuring element 10 are arranged such that the image sensing surface 30a of the image sensor 30 is within the photoreception range of the respective photosensors. Since the photosensors 11~14 are constructed to detect the amount of reflected light generated by the direct light 9 reflected by the surface of the image sensor 30, each photosensor 11~14 is capable of detecting the amount of light corresponding to the amount of incident light entering the image sensor 30.

Since the light measuring element 10 comprises a plurality of photosensors 11~14 arranged at different positions, the disadvantage of poor light adjusting control influenced by regular reflection light characteristics of digital cameras is eliminated. That is, suitable and stable light adjusting control is possible regardless of the reflectivity of a subject area included in the photographic subject.

2. Second Embodiment

A second embodiment of the present invention is described below. The exterior view of the digital camera 1a of the second embodiment is identical to that shown in FIG. 1.

Figure 9:
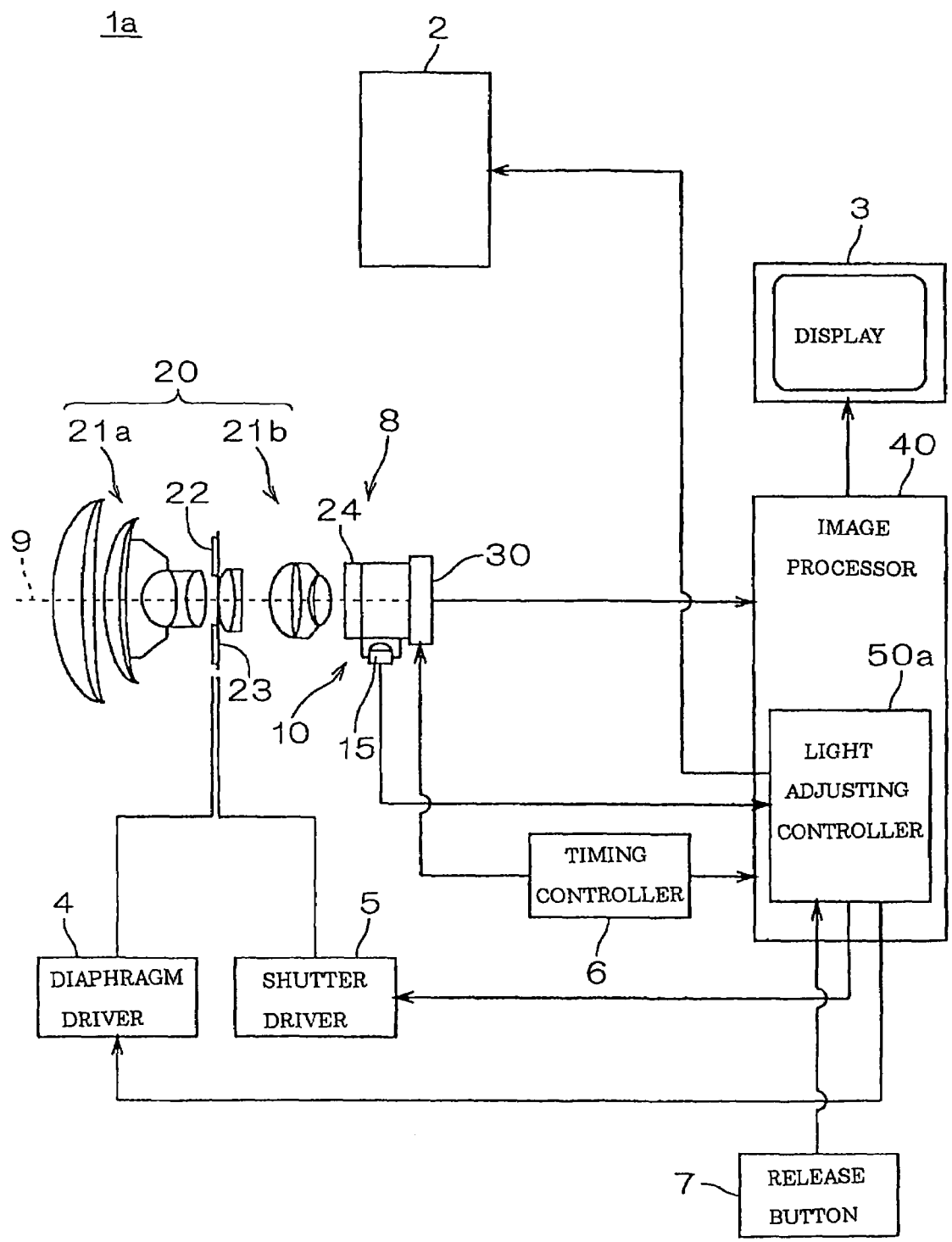
FIG. 9 shows the construction of a digital camera of a second embodiment of the present invention.

FIG. 9 shows the internal construction of digital camera 1a of the second embodiment of the present invention. In FIG. 9, parts having the same function as parts in the first embodiment are designated by like reference numbers. For this reason, detailed descriptions of these like parts in the second embodiment are omitted.

Digital camera 1a of the second embodiment comprises, similar to the first embodiment, an optical unit 20, optical low-pass filter 24, light measuring element 10, image sensor 30, image processor 40, flash unit 2, display 3, diaphragm driver 4, shutter driver 5, timing controller 6, and release button 7. Image processor 40 is provided with a light adjusting controller 50a. Optical unit 20, low-pass filter 24, light measuring element 10, and image sensor 30 are arranged in the interior space of digital camera 1a identically to the first embodiment.

Figure 10:
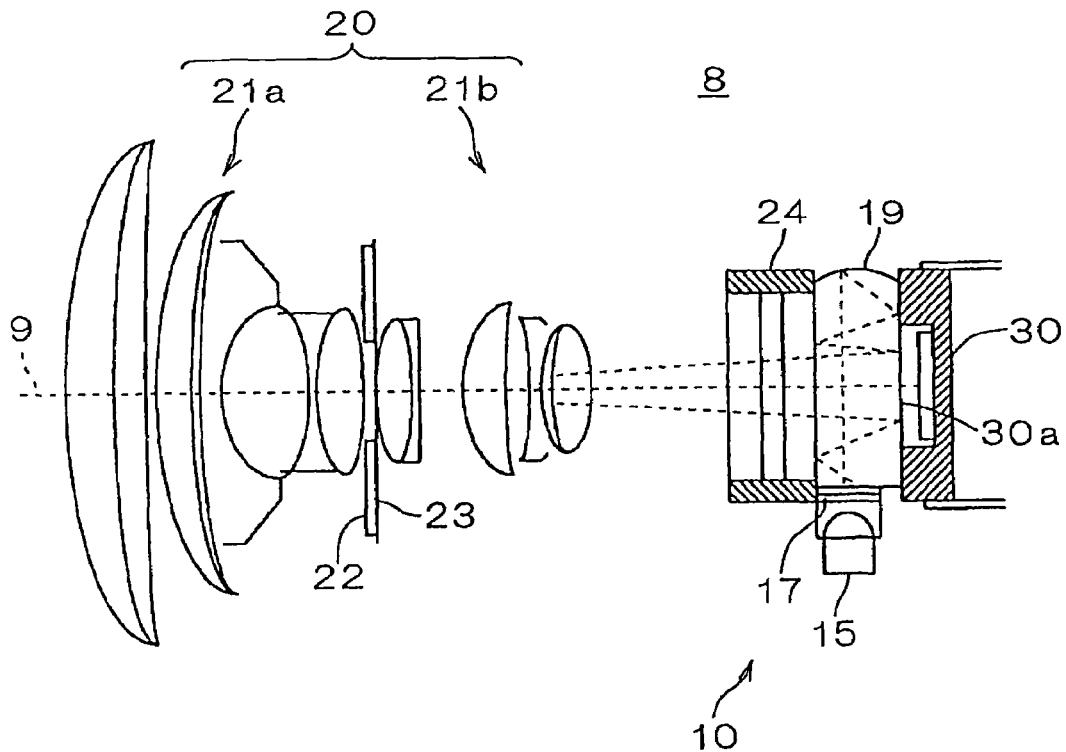
FIG. 10 shows the construction within the space between the optical unit and the image sensor in the digital camera of the second embodiment.

FIG. 10 shows the construction within the interior space of digital camera 1a. In the second embodiment, light measuring element 10 is arranged in the space 8 between the optical unit 20 and the image sensor 30 so as to be outside the optical path of the direct light 9 entering from the photographic subject through the optical unit 20. Light measuring element 10 comprises a photosensor 15 such as a photodiode or the like, and a diffusion plate 17 such as ground glass or the like.

Photosensor 15 is disposed such that the image sensing surface 30a of the image sensor 30 does not enter the photoreception range of the photosensor 15. In the example of FIG. 10, the photoreceptor surface of the photosensor 15 is arranged approximately parallel to the optical path of the direct light 9 from the photographic subject. Photosensor 15 measures the amount of flare light present within the space 8 between the optical unit 20 and the image sensor 30.

Generally, when light passes through an optical element, part of the light component is diffused and reflected within the interior and at the surface of the optical element, causing flare. The amount of light in this flare light naturally changes in conjunction with the change in the amount of light entering the optical element.

This situation is also true of digital cameras. That is, when flare light is caused by reflection on the interior surface within the space 8 of digital camera 1a, the amount of this flare light changes in accordance with the change in the amount of light from the photographic subject. In the second embodiment, photosensor 15 measures the amount of light in this flare light present within the space 8 between the optical unit 20 and the image sensor 30. The second embodiment provides a construction wherein flash light adjusting control is performed based on this measured amount of flare.

In FIG. 10, photosensor 15 is disposed between the low-pass filter 24 and the image sensor 30, and detects the flare present within this space. Since flare light has multiple directionality, the amount of this flare light can be measured even when the image sensing surface 30a of the image sensor 30 does not enter the photoreception range of the photosensor 15.

When the image sensing surface 30a of the image sensor 30 does enter the photoreception range of the photosensor 15, there is a possibility of poor light adjusting control due to the influence of regular reflection light as described in the first embodiment. For this reason, regular reflection light is prevented from directly entering the photosensor 15 in the second embodiment by arranging the photosensor 15 such that the image sensing surface 30a of the image sensor 30 does not enter the photoreception range of the photosensor 15.

The diffusion plate 17 is disposed on the photoreception surface of the photosensor 15 as shown in FIG. 10. Generally, a diffusion plate functions to balance the light intensity. For this reason the light entering the diffusion plate 17 from multiple directions is balanced by placing the diffusion plate 17 on the photoreception surface of the photosensor 15. The average amount of flare light present within the space 8 can be measured by photosensor 15 which detects the balanced light. Accordingly, the amount of light can be suitably measured without being influenced by the presence of flare light having a specific directionality.

Since the image sensing surface 30a of the image sensor 30 does not enter the photoreception range of the photosensor 15, there is no possibility of regular reflection light of the flash illumination entering the photoreception surface of the photosensor 15 from a path of multiple reflection between the image sensing surface 30a and the endface of the low-pass filter 24, or any other path. The influence of any such regular reflection light can be reduced by providing the diffusion plate 17 on the photoreception surface of the photosensor 15.

In this way suitable and stable light measurement is possible by providing the diffusion plate 17 on the photoreception surface of the photosensor 15.

In the second embodiment shown in FIG. 10, a concave mirror 19 is provided at a position opposite the photosensor 15 so as to circumscribe the optical path of the direct light 9 from the photographic subject, and is provided as a condensing element to direct the flare light within the space 8 to the photosensor 15. The flare light within the space 8 between the image sensing surface 30a and the low-pass filter 24 can be condensed toward the photosensor 15 by the disposition of the concave mirror 19. As a result, the problem of inadequate light entering the photoreceptor surface of the photosensor 15 is eliminated. The diffusion plate 17 is effective in preventing re-reflection of the light condensed by the concave mirror 19.

In the second embodiment, light adjusting controller 50a accomplishes flash light adjusting control based on data representing the amount of light in the flare light obtained from the photosensor 15. That is, the second embodiment also provides that light adjusting controller 50a accomplishes flash light adjusting control simultaneously with the main photography operation to capture the image of a photographic subject using flash illumination.

Figure 11:
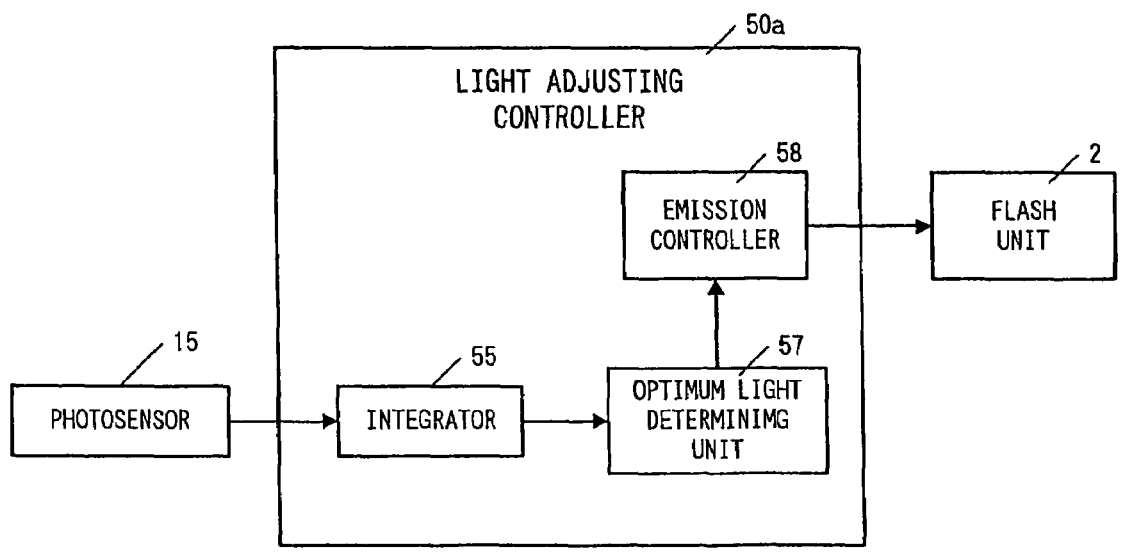
FIG. 11 is a block diagram schematically showing part of the functional means for realizing light adjusting control of the second embodiment.

FIG. 11 is a block diagram schematically showing part of the functional elements in the light adjusting controller 50a. Functional elements provided in the light adjusting controller 50a include an integrator 55, optimum light determining unit 57, and emission controller 58. The integrator 55 integrates photoreception data detected by the photosensor 15. The optimum light determining unit 57 determines whether or not the amount of light is optimum based on the amount of light detected by the photosensor 15. The emission controller 58 controls the timing to stop the flash emission based on the determination result of the optimum light determining unit 57.

Integrator 55 performs an integration operation on the light quantity data obtained from the photosensor 15. Integrator 55 transmits the integration value of the photosensor 15 obtained by this integration operation to the optimum light determining unit 57.

The optimum light determining unit 57 determines whether or not the integration value of the photoreception data sequentially obtained from the integrator 55 has attained the optimum value. The optimum light determining unit 57 transmits the timing to stop the flash emission to the emission controller 58 based on the determination result.

The emission controller 58 outputs predetermined control signals to stop the flash emission to the flash unit 2 based on the flash stop timing.

In the second embodiment, the light adjusting controller 50a performs suitable light adjusting control by controlling the flash light as described above. Since flash light adjusting control is accomplished via a through-the-lens (TTL) method in the second embodiment, as is clear from the layout position of the photosensor 15, the field angles of the image sensor 30 and the light measuring element 10 match. As a result, light adjusting control is accomplished with a high degree of accuracy. Furthermore, provision of a dedicated light measuring element 10 for light adjusting control allows light adjusting control to be performed simultaneously with the main photographic operation. Accordingly, the disadvantage of time lag between light adjusting control by the conventional pre-flash method and taking the actual photograph does not occur.

Figure 12:
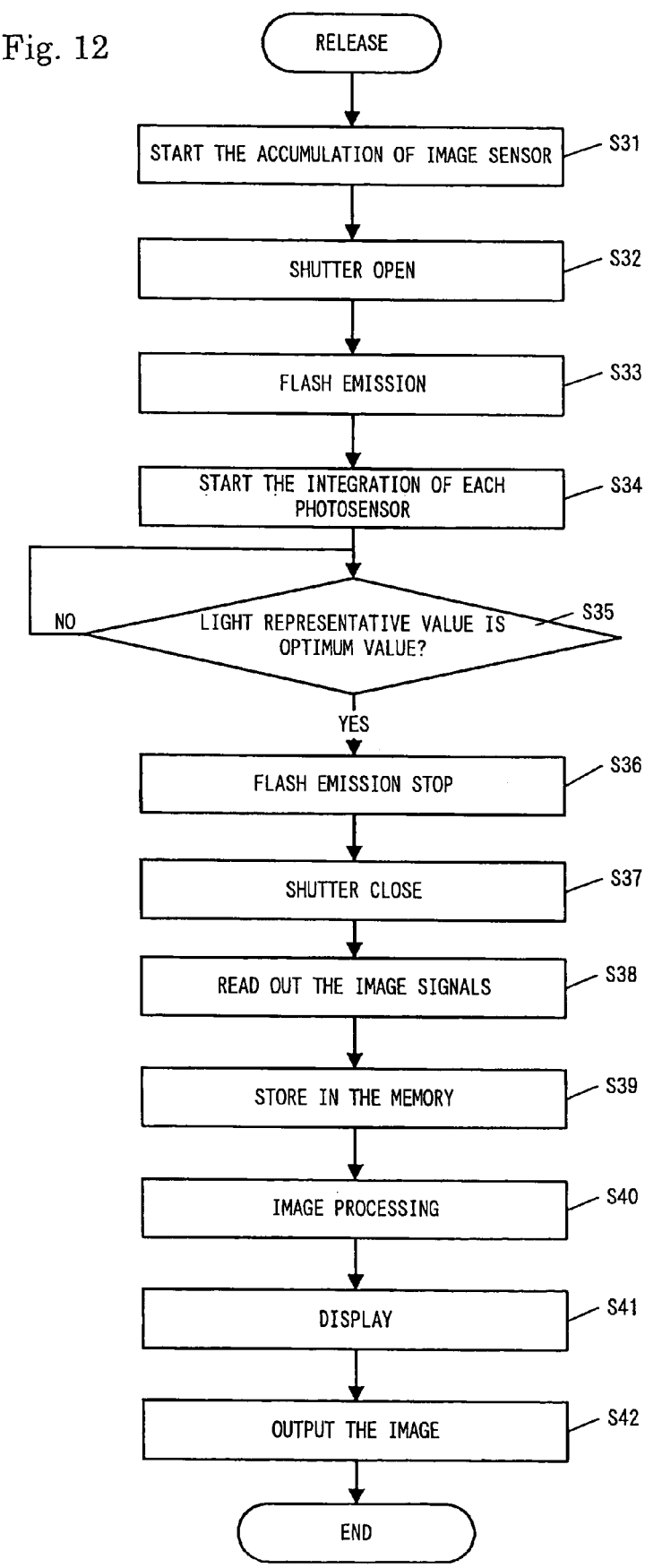
FIG. 12 is a flow chart of the operating sequence of the digital camera of the second embodiment.

The operating sequence for light adjusting control in digital camera 1a of the second embodiment is described below. FIG. 12 is a flow chart showing the operating sequence of digital camera 1a of the second embodiment.

First, light adjusting controller 50a starts load accumulation by the image sensor 30 by transmitting a command to the timing controller 6 (step S31). Then, light adjusting controller 50a opens the shutter 23 to direct light from the photographic subject to the image sensor 30 (step S32). Light adjusting controller 50a starts the flash emission by issuing an emission command to the flash unit 2 (step S33).

Light adjusting controller 50a starts the integration operation of the photoreception data obtained from photosensor 15 (step S34). Since photosensor 15 continues to detect flare light even during the integration operation, the photoreception data integration values gradually increase with the elapsed time.

Then, light adjusting controller 50a determines whether or not the photoreception data integration value has attained a predetermined optimum value (step S35). The photoreception data integration value determination is repeated until the determination in step S35 is [YES].

When the determination in step S35 is [YES], light adjusting controller 50a determines that the exposure relative to image sensor 30 has been optimized, and transmits a flash emission stop command to the flash unit 2 (step S36).

Next, light adjusting controller 50a issues a command to the shutter driver 5 to close the shutter 23 so as to block the light from the photographic subject (step S37). Thereafter, light adjusting controller 50a issues a command to timing controller 6 to stop load accumulation and start image signal readout (step S38). In this way the image signals of the photographic subject obtained by the image sensor 30 are transmitted to the image processor 40.

When image processor 40 receives the image signals from image sensor 30, the image signals are temporarily stored in a memory, not shown in the drawing (step S39). Then, image processor 40 subjects the stored image signals to predetermined image processing such as pixel interpolation, white balance adjustment and the like (step S40), and displays a preview of the processed image signals on display 3 (step S41). The image signals are output to a memory card or the like when the photographer specifies specific output (step S42), and this ends one operation sequence of the digital camera 1a of the second embodiment.

As described above, the digital camera 1a of the second embodiment provides an image sensor 30 which receives the direct light 9 from a photographic subject entering through an optical unit 20, and subjects this direct light 9 to photoelectric conversion to generate image signals of the photographic subject, and further provides a light measuring element 10 in a space 8 medial to the optical unit 20 and the image sensor 30. Flash light adjusting control is accomplished based on the amount of light detected by the light measuring element 10. As a result, the field angle of the image sensor and the photosensors match, such that light adjusting control accuracy is improved and light adjusting control can be accomplished simultaneously with the main photographic operation.

The photosensor 15 which is provided as a light measuring element 10 is disposed such that the image sensing surface 30a of the image sensor 30 does not enter the photoreception range of the photosensor 15. The light measuring element 10 is constructed so as to detect the amount of flare light present in the space 8 between the optical unit 20 and the image sensor 30. As a result, the influence of regular reflection light in the flash emission is reduced, and photosensor 15 can detect the amount of light corresponding to the incident light entering the image sensor 30.

3. Modifications

The present invention is not limited to the previously described embodiments.

For example, each of the aforesaid embodiments has been described by way of examples providing a shutter 23 which opens and closes by mechanical operation. However, such shutters are not necessary in digital cameras, and a function identical to that of the shutter 23 can be realized by resetting the accumulated load of the image sensor 30 and controlling the accumulation time.

Furthermore, the position of the light measuring element 10 in the optical axis direction need not be directly anterior to the image sensor 30 as shown in FIGS. 2 and 9, since the position of the light measuring element 10 may be shifted insofar as it remains within the space 8 between the optical unit 20 and the image sensor 30.

As the distance between the light measuring element 10 and the image sensor 30 increases, there is an increasing possibility that light that does not reach the image sensor 30 may enter the light measuring element 10. Therefore, from the perspective of accurate light adjusting control of the flash illumination, it is desirable that the light measuring element 10 is disposed directly anterior to the image sensor 30 so as to reduce the possibility that light that does not reach the image sensor 30 may enter the light measuring element 10, and allow suitable detection of the light corresponding to the light reaching the image sensor 30.

Furthermore, a diffusion plate 17 is provided directly in front of the light measuring element 10 in the construction of FIG. 2.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A digital camera, comprising:
    an optical system through which light from a photographic subject passes;
    an image sensor which is disposed on an optical axis of said optical system and which receives light passing through said optical system and produces a signal representing an image of the photographic subject;

a light emission system for illuminating the photographic subject;

a plurality of light measuring elements which are disposed away from said optical axis and which sense light from said emission system that is reflected by the photographic subject and passes through said optical system; and a controller which determines an average output value for the output values of all of said light measuring elements to set a standard value, selects the light measuring elements whose output values are less than said standard value, and controls the operation of said light emission system in accordance with the output values from the selected light measuring elements, wherein said plurality of light measuring elements are provided at different positions and detect a brightness of a common area on an image sensing surface of said image sensor at different respective angles.

2. The digital camera of claim 1 wherein said standard value is equal to the determined average value.

3. The digital camera of claim 1 wherein said light measuring elements are located in a space between said optical system and said image sensor.

4. The digital camera of claim 3 wherein said light measuring elements sense light that is reflected by said image sensor.

5. A digital camera, comprising:

an optical system through which light from a photographic subject passes;

an image sensor which is disposed on an optical axis of said optical system and which receives light passing through said optical system and produces a signal representing an image of the photographic subject;

a light emission system for illuminating the photographic subject;

a light measuring element which is located in a space between said optical system and said image sensor such that the image sensing surface of said image sensor is located outside the photoreception range of said light measuring element, to thereby sense flare light within said space; and a controller which controls the operation of said light emission system in accordance with the light sensed by said light measuring element.

6. The digital camera of claim 5, wherein said light measuring element has a photoreceptor surface which is disposed approximately parallel to said optical axis.

7. The digital camera of claim 5 further including a diffusion plate disposed on the photoreceptive surface of said light measuring element.

8. The digital camera of claim 5 further including a condensing element for directing flare light within said space toward said light measuring element.

9. The digital camera of claim 8 wherein said light measuring element is located on one side of said optical path, and said condensing element comprises a concave mirror located on the opposite side of said optical path.

10. The digital camera of claim 8 wherein said condensing element comprises a mirror which circumscribes said optical axis.

11. The digital camera of claim 8 wherein said optical system includes a low-pass filter through which light passes before it is received by said image sensor, and said condensing element is disposed between said low-pass filter and said image sensor.

* * * * *